(12) United States Patent  
Tsukagoshi et al.

(10) Patent No.: US 9,029,968 B2  
(45) Date of Patent: May 12, 2015

(54) OPTICAL SENSOR DEVICE

(71) Applicant: Seiko Instruments Inc., Chiba (JP)

(72) Inventors: Koji Tsukagoshi, Chiba (JP); Hitoshi Kamamori, Chiba (JP); Sadao Oku, Chiba (JP); Hiroyuki Fujita, Chiba (JP); Keiichiro Hayashi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 13/676,404

(22) Filed: Nov. 14, 2012

(65) Prior Publication Data

US 2013/0126702 A1   May 23, 2013

(30) Foreign Application Priority Data

Nov. 17, 2011   (JP) .................................. 2011-251969

(51) Int. Cl.  
*H01L 31/0232* (2014.01)  
*G01J 1/44* (2006.01)  
*G01J 1/02* (2006.01)  
*G01J 1/42* (2006.01)

(52) U.S. Cl.  
CPC .................. *G01J 1/44* (2013.01); *G01J 1/0271* (2013.01); *G01J 1/0204* (2013.01); *G01J 1/42* (2013.01)

(58) Field of Classification Search  
None  
See application file for complete search history.

(56) References Cited

U.S. PATENT DOCUMENTS

| 5,972,488 A * | 10/1999 | Nagata et al. ............... 428/304.4 |
| 2010/0019338 A1* | 1/2010 | Kwon et al. .................. 257/433 |
| 2010/0052086 A1* | 3/2010 | Kinsman ....................... 257/432 |
| 2012/0104524 A1* | 5/2012 | Takeshita et al. ............. 257/432 |

FOREIGN PATENT DOCUMENTS

| JP | 08036264 | 2/2007 | |
| JP | 2007234783 | 9/2007 | |
| WO | WO 2011/065485 A1 * | 3/2011 | ............. H01L 23/12 |

* cited by examiner

*Primary Examiner* — David Vu  
*Assistant Examiner* — Cuong B Nguyen  
(74) *Attorney, Agent, or Firm* — Adams & Wilks

(57) ABSTRACT

An optical sensor element is mounted in a package which includes a glass substrate having a cavity, and a glass lid substrate bonded to the other substrate to close the cavity. The glass substrate with the cavity has metalized wiring patterns on front and rear surfaces thereof, and a through hole filled with metal to form a through-electrode interconnecting the wiring patterns on the front and rear surfaces. A metalized wiring pattern on the rear surface of the glass lid substrate is electrically connected to the wiring pattern on the front surface of the other substrate with an adhesive containing conductive particles. The glass lid substrate is made either of glass having a filter function or glass having a light shielding property with an opening therethrough filled with glass having a filter function.

11 Claims, 2 Drawing Sheets

OPTICAL SENSOR DEVICE

BACKGROUND OF THE INVENTION

1. Field of the Invention

The present invention relates to an optical sensor device in which an optical sensor element is mounted on a package material using a glass substrate.

2. Description of the Related Art

In recent years, mobile terminals such as mobile personal computers, tablet personal computers, and smartphones are rapidly becoming widespread. Further, flat screen televisions and LED lighting for inside and outside lighting devices are significantly becoming widespread. The reason behind this is because those mobile terminals have a large number of functions and another main reason is that they are designed to promote portability such as light in weight and thin in thickness. At the same time, in the fiat screen televisions, and the inside end outside lighting devices, there has been a development problem of an energy-saving rate along with an increase in performance year after year, and many of the televisions and devices have a function of controlling the illuminance finely. The number of electronic parts used in those mobile terminals, fiat screen televisions, and the inside and outside lighting devices is numerous along with the pursuit of multi-functionality and portability, and further reduction in size, thickness, and cost and power saving in electronic parts are now always required. As a result, a resin mold package has been widely adopted. The reason behind this is the common use of parts and materials. An optical sensor, which is a one of electronic parts mounted to reduce the power consumption, is not exceptional. Similar to other electronic parts, reduction of the size, thickness, and cost are aimed at in marry optical sensor products by the use of resin mold package.

FIG. 2 of Japanese Published Patent Application No. 2007-36264 discloses a cross-sectional view of an illuminance sensor package in which a light receiving element is mounted on an insulating substrate made of a resin material and is molded by a resin. An electrode 4 is formed on the front surface of a resin substrate 1. The electrode 4 is wired so as to surround the rear surface of the substrate from the front surface of the substrate, thereby being connectable to the outside. The electrode 4 has an optical sensor element 1 mounted thereon. A top surface 2a of the optical sensor element 2 and the electrode 4 are electrically connected via a wire 6. The optical sensor element 2 is firmly fixed onto the electrode 4 by a conductive paste 5. The conductive paste 5 electrically connects the optical sensor element 2 and the electrode 4 to each other. Electromotive force generated by light entering the optical sensor element 2 can flow from the conductive paste 5 to the electrode 4 so as to be transmitted to the outside.

In Japanese Published Patent Application No. 2007-36264, the optical sensor element 2 is molded by a resin 11 as a whole. The resin 11 is made of a translucent resin, and an epoxy resin or the like is used. An infrared absorbing film 12 is provided on the resin 11. The infrared absorbing film 12 uses a resin and has a structure in which a liquid resin or a film is adhered and laminated on she resin 11. As the liquid resin, an epoxy resin or the like is used. In the case of using a film, a film is adhered on the resin 11 via a resin adhesive. With this, the optical sensor element 2 can receive visible light from which infrared light has been filtered, thereby serving as an optical sensor corresponding to the visibility. Such infrared absorbing effect can also be obtained even when an infrared absorbing substance used for the infrared absorbing film 12 is dispersed and mixed in the translucent resin 11.

However, the optical sensor device described in Japanese Published Patent Application No. 2007-36264 has a package structure in which an epoxy resin or the like is used for sealing the element, and hence has a problem such as weak in environmental reliability including heat resistance and moisture resistance of the material. Further, the resin used for sealing the element is required to be translucent, and thus, it is generally thought to be difficult for the resin to be resistant to heat at the same time. Further, the sealing resin seals the optical sensor element 2 and the wire 6, and thus, design for alleviating stress on the optical sensor element and the wire is necessary, requiring low stress. It follows that the range of selection of the sealing resin which significantly determines the reliability of the device is limited: low resistance to heat; low stress; easy to take up moisture; easy to expand at a high temperature; and the like. As a result, it is difficult to obtain high performance in an environment in which heat and moisture are added or in an environment in which expansion and contraction are repeated in a temperature cycle repeating high temperature and low temperature as in a reliability test.

Further, in the optical sensor device described in Japanese Published Patent Application No. 2007-36264, a resin such as an epoxy resin is used as an example for sealing the optical sensor element 2. In this case, the resin may be decomposed by moisture, heat, ultraviolet radiation, or the like. It is known that, as a result, the sealing resin is gradually deteriorated and exhibits discoloration or the like, and at the same time, the transmittance thereof is lowered. As a result, there is a problem that light is less liable to enter the optical sensor element, and desired properties and reliability as art optical sensor device cannot be obtained.

Further, in the optical sensor device described in Japanese Published Patent Application No. 2007-36264, the optical sensor element 2 and the electrode 4 electrically connected to the upper surface 2a of the optical sensor element 2 via the wire 6 are mounted on the same surface, and the electrode 4 is used for connection to the outside. In the case of this structure, in order to reduce the size of the optical sensor device, the distance between the external electrode 4 electrically connected to the mounted substrate and the optical sensor element 2 and the length of the wire 6 are required to be short, and thus, it is required that, for example, the thickness of the resin which seals the optical sensor element 2 be small. As a result, for example, in reflowing carried out in a process of mounting the optical sensor device, phenomena such as wicking and erosion of solder paste used for connection to the mounted substrate are accompanied by entry of the solder paste from between the sealing resin and the electrode 4, and a risk of separation of the wire or separation from the sealing resin increases.

FIG. 1 of Japanese Published Patent Application No. 2007-234783 discloses a cross-sectional view of a light receiving sensor package in which a light receiving element is mounted on a leadframe and sealed by a resin mold. In the optical sensor device described in Japanese Published Patent Application No. 2007-234783, with regard to change in the properties and lowered reliability of the above-mentioned optical sensor device described in Japanese Published Patent Application No. 2007-36264, by containing an inorganic filler in a sealing resin material, the coefficient of thermal excursion is adjusted, and the resin is improved to have a certain effect. This improvement obtains the effect of improving performance in an environment in which expansion and contraction are repeated in a temperature cycle repeating high temperature and low temperature, which causes a problem of a conventional sealing resin material. A certain effect is expected also with regard to improvement in the heat resistance.

Further, in the optical sensor device disclosed in Japanese Published Patent Application No. 2007-234783, the distance between an optical sensor element 10 and a lead portion 22 for external connection of a leadframe 20 electrically connected to an upper surface of the optical sensor element 10 via a wire 25 is relatively large. As a result, separation between the leadframe 20 and the wire 25 and separation between a sealing resin 30 and the leadframe 20 caused by wicking or erosion of solder paste in mounting such as relieving can be inhibited.

The optical sensor device described in Japanese Published Patent Application No. 2007-234783 obtains the effect by containing an inorganic filler in a transparent epoxy resin or the like for sealing, but, when an inorganic filler is mixed in a resin, it is known that air exists at an interface between the inorganic filler and the resin a rut that it is not easy to mix the inorganic filler in the resin so that the refractive index and the surface state of the inorganic filler do not lower the optical properties of the transparent sealing resin at all. As the content of the inorganic filler increases, the reliability improves more, but the transmittance lowers, and thus, light is less liable to enter the optical sensor element 10, and the device does not function as an optical sensor device. Accordingly there is a possibility that the effect of improving the reliability of the optical sensor device by adding inorganic filler is limited.

Further, the optical sensor device described in Japanese Published Patent Application No. 2007-234783 has the lead portion 22 for external connection of the leadframe 20, the lead portion 22 being relatively away from the optical sensor element 10 and protruding significantly from the sealing resin 30, and thus, the reliability in mounting is improved, but the package size is liable to increase, and it is difficult to enjoy the merits of miniaturization. Accordingly, it is difficult to accommodate the use where portability is required.

Under these circumstances, an electronic part in which glass is used for a package material is partly in actual use. A glass material prevents moisture and contaminants from entering from the outside, and maintains high airtightness. Further, since the glass material has a thermal expansion coefficient which is close to that of a silicon substrate forming a semiconductor element, reliability of the mounting surface and the bonding surface can be enhanced when the semiconductor element is mounted on a glass package. Further, since the glass material is inexpensive, increase in product cost can be suppressed.

SUMMARY OF THE INVENTION

An optical sensor device of the present invention includes: one of a light shielding glass substrate having a filter function in part and a transparent glass substrate having a filter function; one of a light shielding glass substrate having a cavity and a transparent glass substrate having a cavity; and an optical sensor element mounted on any one of the substrates. Each of a front surface of the glass substrate having a filter function and a front surface of the glass substrate having a cavity has a wiring pattern provided thereon by metalization. A rear surface of the glass substrate having a cavity has a wiring pattern provided thereon by metalization which is electrically connected via a through-electrode to the wiring pattern provided on the front surface. The glass substrate having a filter function and the glass substrate having a cavity are fixed to each other with an adhesive having conductive particles added thereto.

Further, as the glass substrate having a cavity, a glass substrate including the through-electrode is used.

Further, the through-electrode has a structure in which metal is filled.

Further, as the glass substrate having a cavity, a glass substrate having wiring patterns provided by metalization on a front surface and a rear surface, respectively, of the glass substrate is used.

Further, the wiring patterns provided by metalization are formed simultaneously with the metal filled in the through-electrode and structurally and electrically integrated with the metal filled in the through-electrode.

Further, the glass substrate having a filter function and the glass substrate having a cavity are fixed to each other with an adhesive having conductive particles added thereto.

Further, the wiring patterns provided by metalization on the front surface of the glass substrate having a filter function and the front surface of the glass substrate having a cavity are electrically continuous by the adhesive having conductive particles added thereto.

The optical sensor device according to the present invention can completely hermetically seal the optical sensor element with glass. The metal is ill led in the through-electrode, and the filled metal also forms the wiring patterns provided on the front surface and the rear surface of the glass substrate having a cavity so as to be integral therewith. This not only causes the element to be free from stress but also stabilizes electrical connection between the front surface and the rear surface of the glass substrate having a cavity and prevents the through-electrode and the wiring patterns from easily separating from each other, and thus, obtains high reliability in mounting. Further, the wiring patterns provided by metalization on the front surface of the glass substrate having a filter function and the front surface of the glass substrate having a cavity are fixed to each other and, at the same time, electrically connected to each other by the adhesive having conductive particles added thereto, and thus, a package which has both stability in electrical continuity and high reliability against environmental change is obtained. Further, the package has a structure in which glass substrates are bonded together and which includes only a glass material, and thus, the difference in coefficient of expansion can be extremely reduced, and an optical sensor device which is excellent in cost, properties, reliability in mounting, and reliability can be provided.

DETAILED DESCRIPTION OF THE EMBODIMENTS

Figure 1:
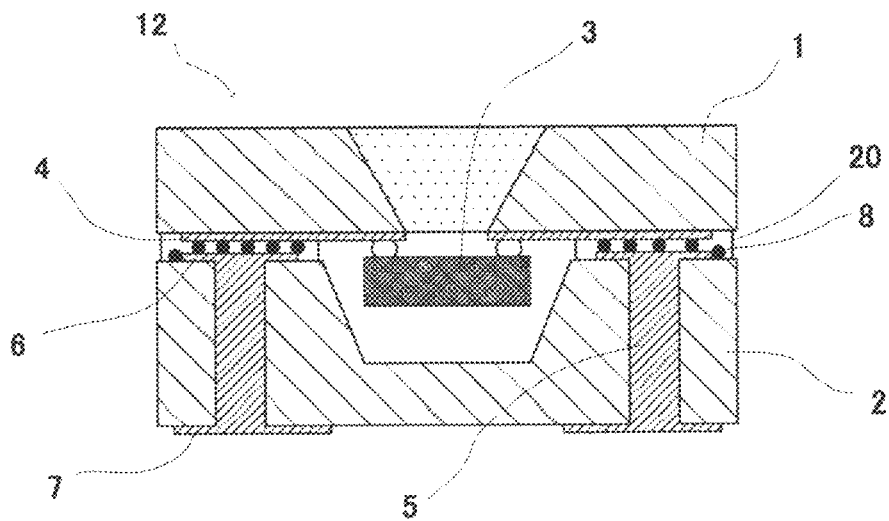
FIG. 1 is a cross-sectional view schematically illustrating a structure of an optical sensor device of the present invention.

An optical sensor device of the present invention includes a light shielding glass substrate having a filter function in part or a transparent glass substrate having a filter function, a light shielding glass substrate having a cavity or a transparent glass substrate having a cavity, a wiring pattern provided by metalization on the glass substrate having a filter function, a wiring pattern provided by metalization on the glass substrate having a cavity, and an optical sensor element mounted on the glass substrate and electrically connected to tone wiring pattern. The optical sensor device has a structure in which the optical sensor element is fixed so as to be surrounded by the glass substrate having a filter function and the glass substrate having a cavity. The wiring pattern provided by metalization on the glass substrate having a filter function and the wiring pattern provided by metalization on the glass substrate having a cavity obtain electrical connection and are simultaneously fixed to each other with an adhesive having conductive particles added thereto. FIG. 1 schematically illustrates a structure in cross-section of the optical sensor device of the present invention.

A glass substrate 1 (hereinafter referred to as glass lid substrate 1) is formed of glass having a light shielding property or transparent glass. When glass having a light shielding property is used, a through hole is provided in the center of the glass lid substrate 1. Glass having a filter function is filled in the through hole. This glass has the function of filtering out a predetermined wavelength of, for example, infrared radiation, and is appropriately selected in accordance with the function of the optical sensor element to be used. As shown in FIG. 1, the glass lid substrate 1 is a one-piece structure and has the same thickness throughout.

A glass substrate 2 is formed of glass having a light shielding property or transparent glass, and is shaped to have a cavity. The structure after the glass substrate 2 is bonded to the glass lid substrate 1 is that side surfaces and a bottom surface of an optical sensor element 3 are surrounded by the glass substrate 2.

Further, a transparent glass may be used as the glass lid substrate 1, and may have a filter function by providing an interference filter formed of a metal oxide multilayer firm on a front surface of the transparent glass.

The glass lid substrate 1 has a wiring pattern 4 provided by metalization and the optical sensor element 3 is mounted on and electrically connected to the wiring pattern 4.

The glass substrate 2 has a through hole in which metal is filled to form a through-electrode 5. Further, the glass substrate 2 has a wiring pattern 6 provided by metalization. The metal filled in the through hole to form the through-electrode 5 and the wiring pattern 6 are formed simultaneously, are structurally integral with each other, and are electrically connected to each other.

In a structure in which the glass lid substrate 1 and the glass substrate 2 are bonded together, the wiring pattern 4 provided by metalization on the glass lid substrate 1 and the wiring pattern provided by metalization on the glass substrate 2 are fixed to each other with an adhesive having conductive particles 8 added thereto, and, the optical sensor element 3, the wiring pattern 4 provided by metalization on the glass lid substrate 1, and the wiring pattern 6 provided by metalization on the glass substrate 2 obtain electrical connection and electromotive force is transmitted through the through-electrode 5 and a wiring pattern 7 to the outside.

First Embodiment

The structure of an optical sensor device according to this embodiment is hereinafter described with reference to the drawings.

FIG. 1 is a schematic view illustrating an optical sensor device 12 according to this embodiment. FIG. 1 is a longitudinal cross-sectional view of the optical sensor device 12. The optical sensor element 3 is mounted on the glass lid substrate 1 having a filter function. The glass lid substrate 1 is bonded to the glass substrate 2 having a cavity (glass substrate with a cavity) to be integral therewith. The wiring pattern 4 is formed by metalization on the bottom surface of the glass lid substrate 1 and, as illustrated, does not extend inside the glass lid substrate. The optical sensor element 3 is mounted in the center of the glass lid substrate 1 and is electrically connected to the wiring pattern 4. The optical sensor element 3 is mounted on and electrically connected to the wiring pattern 4 provided by metalization on the glass lid substrate 1 by flip-chip bonding. Further, a cavity and the through-electrode 5 are provided in the glass substrate 2. With regard to the through-electrode 5, metal is filled in the through hole which penetrates the glass from a front surface to a rear surface of the glass substrate 2 in a thickness direction of the glass, and the wiring pattern 6 formed by metalization on the front surface of the glass substrate 2 and the wiring pattern 7 formed by metalization on the rear surface of the substrate which is on the side opposite to the cavity are electrically connected to each other by the structure integral with the through-electrode 5. In bonding and fixing to each other the glass lid substrate 1 and the glass substrate 2, the adhesive having conductive particles added thereto is used. The wiring pattern 4 and the wiring pattern 6 are electrically connected to each other via the conductive particles 8, and thus, electromotive force generated at the optical sensor element 3 can be transmitted through the wiring pattern 4 on which the optical sensor element 3 is mounted and to which the optical sensor element 3 is electrically connected, the wiring pattern 6, the through-electrode 5, and the wiring pattern 7 to the outside.

In this case, the through-electrode 5 includes the metal filled in the through hole, and the wiring patterns provided by metalization on the front surface and the rear surface of the glass substrate 2, which are simultaneously formed of the same material to have an integral structure for connection. The metal filled in the through hole and the wiring patterns 6 and 7 provided by metalization on the front surface and the rear surface, respectively, of the glass substrate 2 are not isolated at least in a part of the metal filled in the through hole. This structure prevents disconnection and separation between the wiring patterns and the through-electrode, and thus, stable electrical connection can be obtained over an extended period of time. With regard to the metal forming the through-electrode, the same metal material is used to simultaneously form by metalization the through-electrode 5 and the wiring patterns on the front surface and the rear surface, respectively, of the glass substrate 2. Alternatively, pin-shaped metal may be filled in the through hole and portions thereof which are exposed on the front surface and the rear surface of the glass substrate 2 may be shaped to be, for example, thin and flat so as to serve also as the wiring patterns. As the through-electrode, metal such as copper or gold is used, but the present invention is not limited thereto.

Further, an adhesive 20 having conductive particles added thereto used for bonding and fixing so each other the glass lid substrate 1 and the glass substrate 2 is formed by mixing, with an adhesive, metal bails or balls coated with metal. The kind of the metal and the kind of the adhesive are not specifically limited. It is preferred that the diameter of she balls be 20 μm or less, but the present invention is not limited thereto.

Further, the optical sensor element 3 surrounded by the glass lid substrate 1 and the glass substrate 2 having a cavity can be maintained in a hermetically sealed hollow state. As a result, the optical sensor element 3 receives no stress, which occurs in a structure sealed by a resin mold, on the element. Further, since the wiring patterns 6 and 7 provided on the glass substrate 2 are formed with the through-electrode provided in the thickness direction of the glass substrate 2, the optical sensor element 3 and its surrounding areas located away from the connection to the outside, permitting no adverse effect of wicking or erosion of solder paste in mounting, and the enhanced reliability for mounting and environment.

Second Embodiment

Figure 2:
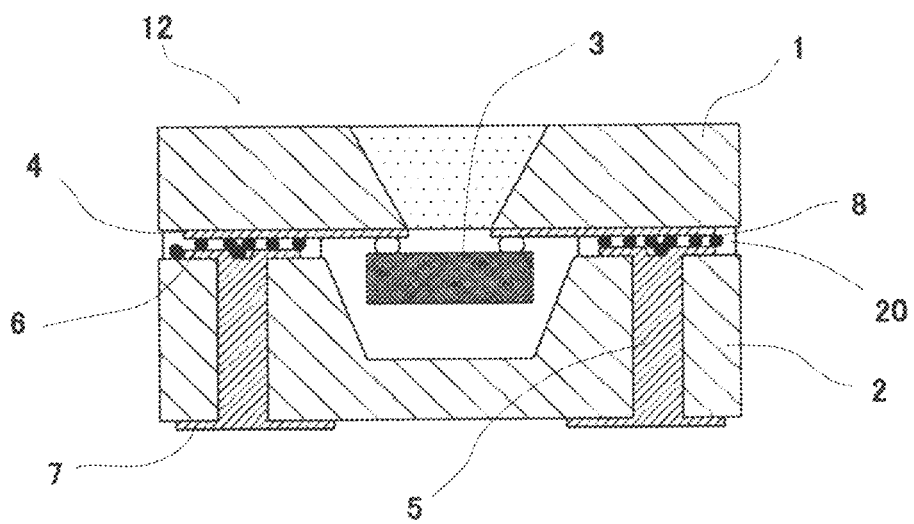
FIG. 2 is a cross-sectional view schematically illustrating a structure of another optical sensor device of the present invention.

FIG. 2 is a cross-sectional view of the optical, sensor device 12 according to this embodiment. The structure of being bonded to the glass lid substrate 1 is similar to that of the first embodiment, but the wiring pattern provided by metalization on the front surface of the glass substrate 2 is partially concave. When the glass lid substrate 1 and the glass substrate 2 are bonded and fixed to each other, the wiring pattern 4 provided by metalization on the glass lid substrate 1 and the wiring pattern 6 provided by metalization on the front surface of the glass substrate having a cavity are fixed to each other with the adhesive 20 having conductive particles added, thereto. By providing a concave portion in the bonded location in a part of the wiring pattern provided on the glass substrate 2, the thickness of the adhesive may be set partially large.

Further, since the conductive particles which carry out electrical connection build up in the concave portion, a plurality of the conductive particles are arranged not only in a plane direction but also in the thickness direction, and areas in which the density of the conductive particles is high can foe provided, leading to an effect that enhanced adhesive strength and enhanced stability in electrical connection, can be obtained at the same time. The dimensions, shape, number, position, and the like of the concave portion are not specifically limited, and can be selected as appropriate.

Third Embodiment

Figure 3:
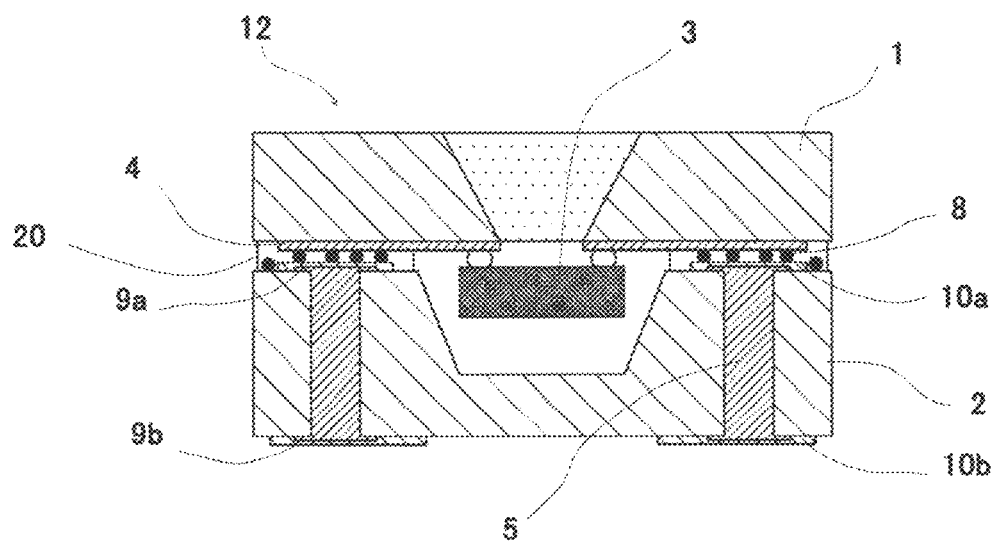
FIG. 3 is a cross-sectional view schematically illustrating a structure of still another optical sensor device of the present invention.

FIG. 3 is a cross-sectional view of the optical sensor device 12 according to this embodiment. The through hole which is provided in the glass substrate 2 and in which metal is filled in the first embodiment is formed using, for example a metal pin. A part of the metal pin is exposed on the front surface and the rear surface of the glass substrate 2, and the exposed portions have thin and flat shapes 9a and 9b, respectively. A part of the exposed pin also serves as a wiring pattern. Further, a part of the pin exposed on the front surface and the rear surface of the glass substrate 2 may additionally have wiring patterns 10a and 10b provided by metalization on the surfaces thereof. The wiring patterns are formed by metalization on the metal surfaces of the pin, and thus, the metal which forms the wiring patterns diffuses toward surface layers of the pin and can have firm coupling. This effect enables the metal pin and the wiring patterns provided by metalization to have a so-called integral structure, and to be combined with another material as a part thereof. For example, it is possible to use, as the pin, metal having the coefficient of expansion close to that of glass or metal which is highly adhesive, and to use, as the wiring patterns, metal suitable for metalization, metal which is effective as a barrier against molten solder paste, or metal having the hardness different from that of the pin. Accordingly stable electrical conductivity and reliability can be obtained.

Fourth Embodiment

Figure 4:
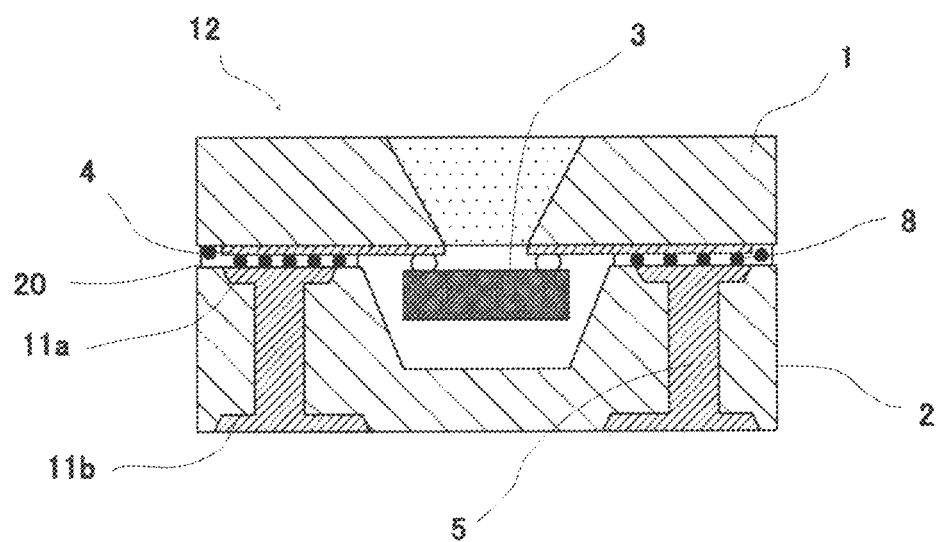
FIG. 4 is a cross-sectional view schematically illustrating a structure of yet another optical sensor device of the present invention.

FIG. 4 is a cross-sectional view of the optical sensor device 12 according to this embodiment. Note that, description of structural members which are similar to those in the first embodiment is emitted. As illustrated in FIG. 4, in this embodiment, in the glass substrate 2, the wiring patterns provided by metalization are not provided on the front surface and the rear surface of the glass substrate 2. The through-electrode stays within the thickness of the glass substrate 2, and portions 11a and 11b of the through-electrode which are exposed on the front surface and the rear surface, respectively, of the glass substrate 2 are formed so as to have larger widths than that of the center portion of the through-electrode 5 in the thickness direction of the glass substrate 2. In this way, the portions 11a and 11b can also serve as the wiring patterns provided on the glass substrate 2. The process of providing by metalization the wiring patterns on the glass substrate 2 can be eliminated or simplified, and thus, the cost can be reduced. In addition, the certain thickness of the wiring patterns formed by metalization on the front surface and the rear surface of the glass substrate 2 can be eliminated, and thus, there is an effect that the thickness of the package as a whole can be reduced.

Since the optical sensor device whose element is surrounded by glass having high reliability and an optical sensor function corresponding to visible light can be provided easily at low cost, the present invention can contribute to the supply of various devices equipped with the optical sensor device, such as mobile terminals and lighting fixtures, which cover the indoor and outdoor applications and the use under a severe environment.

What is claimed is:

1. An optical sensor device, comprising:
   a glass lid substrate;
   an optical sensor element electrically connected to a wiring pattern provided by metalization on the glass lid substrate; and
   a glass substrate with a cavity bonded to the glass lid substrate, wherein:
   the glass lid substrate is made entirely of glass having a light shielding property and has an opening therethrough filled with a glass having a filter function of filtering out a predetermined wavelength of radiation;
   the glass substrate with the cavity includes therein a through-hole filled with metal to form a through-electrode;
   the glass substrate with the cavity includes wiring patterns provided by metalization on a side of a surface having the cavity and on an opposite surface side, respectively;
   the wiring patterns and the through-electrode are structurally integral with each other;
   the wiring pattern on the glass lid substrate and the wiring pattern on the side of the surface having the cavity on the glass substrate with the cavity are electrically connected to each other with an adhesive having conductive particles added thereto; and
   the glass lid substrate and the glass substrate with the cavity are fixed and bonded together.

2. An optical sensor device according to claim 1, wherein the glass substrate with the cavity comprises one of a glass substrate having a light shielding property and a transparent glass substrate.

3. An optical sensor device according to claim 2, wherein the glass substrate having a light shielding property comprises glass which itself has a light shielding property.

4. An optical sensor device according to claim 1, wherein the adhesive comprises an adhesive mixed with one of metal balls and balls coated with metal, the balls having a diameter of 20 μm or less.

5. An optical sensor device according to claim 1, wherein the through-electrode is provided by metalization;

the wiring patterns provided by metalization on a front surface and a rear surface of the glass substrate with the cavity are also continuously formed simultaneously with the filling of the metal in the through hole; and the metal filled in the through hole and the wiring patterns are structurally and electrically integrated with each other.

6. An optical sensor device according to claim 1, wherein the wiring pattern provided by metalization on the front surface of the glass substrate with a cavity is partially concave.

7. An optical sensor device according to claim 1, wherein the through-electrode in which metal is filled comprises a metal pin filled in a through hole, and tips of the metal pin exposed on a front surface and a rear surface of the glass substrate with a cavity are shaped to be thin and flat so as to also serve as the wiring patterns; and the wiring patterns are additionally formed by metalization on the tips of the metal pin so that the metalized metal and surface layers of the tips of the metal pin are diffusion bonded together to have an integral metal structure of the metal pin and the wiring patterns.

8. An optical sensor device according to claim 1, wherein portions of the through-electrode in which metal is filled that are exposed on a front surface and a rear surface of the glass substrate with a cavity have a width larger than a width of a center portion of the through-electrode in a thickness direction of the glass substrate with a cavity; and the through-electrode does not protrude from the glass substrate with a cavity but stays within a thickness of the glass substrate with a cavity.

9. An optical sensor device according to claim 1, wherein the glass lid substrate has the same thickness throughout.

10. An optical sensor device according to claim 1, wherein the wiring pattern on the glass lid substrate extends only along a bottom surface of the glass lid substrate and does not extend inside the glass lid substrate.

11. An optical sensor device according to claim 1, wherein the glass lid substrate is comprised of the same glass throughout.

* * * * *